Figure 1:
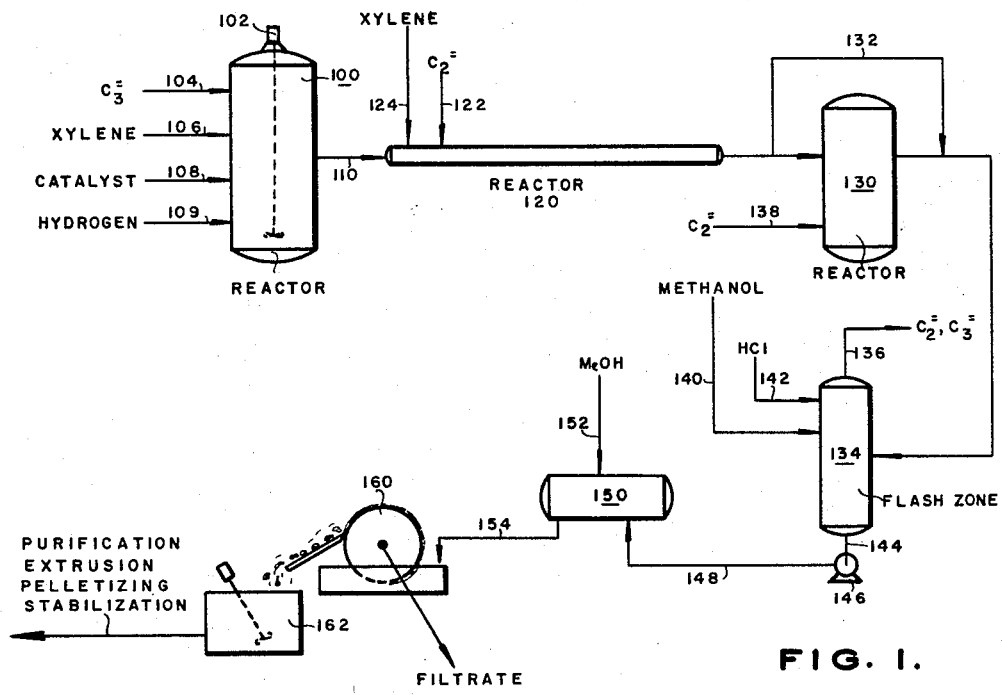

Dec. 3, 1968  A. M. JONES ET AL  3,414,637
PROCESS FOR PREPARING PROPYLENE/ETHYLENE BLOCK COPOLYMERS
Filed Dec. 19, 1963  3 Sheets-Sheet 1

INVENTORS.
ALVA M. JONES,
JEROME A. PLANCHARD, JR.,
RAYMOND A SPEED,
BILLY E. CLAYBAUGH,

ATTORNEY

INVENTORS.
ALVA M. JONES,
JEROME A. PLANCHARD, JR.,
RAYMOND A. SPEED,
BILLY E. CLAYBAUGH,

ATTORNEY

United States Patent Office 3,414,637
Patented Dec. 3, 1968

3,414,637
PROCESS FOR PREPARING PROPYLENE/
ETHYLENE BLOCK COPOLYMERS
Alva M. Jones, Jerome A. Planchard, Jr., Raymond A. Speed, and Billy E. Claybaugh, Baytown, Tex., assignors, by mesne assignments, to Esso Research and Engineering Company, Elizabeth, N.J., a corporation of Delaware
Filed Dec. 19, 1963, Ser. No. 331,750
5 Claims. (Cl. 260—878)

The present invention relates to a novel copolymer and a method of producing it. More specifically, the present invention relates to a propylene-ethylene block copolymer having extremely sharp delineation between the propylene and ethylene portion of the polymer chain, and a method of producing this polymer. In its most specific aspects, the present invention relates to a propylene-ethylene copolymer having from 6 to 10 weight percent ethylene incorporated in the final product, and exhibiting a ratio of infrared absorbance at 720 cm.$^{-1}$ divided by absorbance at 730 cm.$^{-1}$ of 1.3 or greater.

Polypropylene is a widely used plastic material which has found a variety of uses. A serious drawback in the use of polypropylene, however, is the fact that at low temperatures the impact strength of polypropylene is less than that demanded in certain industrial and commercial uses. In order to obtain a wide range of polypropylene products which have satisfactory low temperature impact strengths, it has been the practice to blend polyisobutylene rubber with polypropylene in various amounts, thereby obtaining suitably high impact strengths at low temperature. However, there are certain drawbacks to the use of polyisobutylene blends with polypropylene. The color of blend is not as satisfactory as the color of the initial polypropylene, the softening temperature is generally lower than desirable, and most important, the high impact blends do not have the desirable flow characteristics at low melt indexes, and do not usually fill a large mold.

The present block copolymer formed of propylene and ethylene is markedly superior on all counts, exhibiting an optimization of the low temperature impact strength while not sacrificing flexural stiffness, and having superior physical properties at the various melt indexes.

In order to be of optimum utility, a polymer should exhibit linear blending characteristics with other materials so that a full range of physical properties can be prepared. In the present instance, the copolymer product of the present process is fully compatible and exhibits predictable blending characteristics with homopolypropylene polymer, all of which is to be set out in more detail hereinafter.

The process

The process of the present invention generally relates to a two-stage polymerization process. In the first-stage reactor, living chains of polypropylene are formed whereupon the ethylene copolymer is to be engrafted in the second reactor. In the first-stage reactor, during the formation of the living polypropylene chains, a certain amount of "dead" homopolypropylene polymer also is produced which is carried over into the second-stage reactor. In order to control the molecular weight, both of the polypropylene homopolymer which is carried through the process and of the polypropylene portion of the copolymer chain, a certain amount of hydrogen may be introduced.

The first-stage reactor may be of a wide range of L/D ratios, preferably from 1 to 10.

The charge stream admitted into the first-stage reactor is conveniently discussed on the basis of the amount of diluent which is provided. This diluent is suitably chosen from those well known to be useful in the propylene polymerization process. Exemplary is the group consisting of aromatic hydrocarbons, alkyl-substituted aromatic hydrocarbons, paraffins, and isoparaffins, with xylene being a preferred member of the group. In the first reactor, using 100 pounds of the diluent as the basis, the propylene feed stream may comprise from 5 to 50 pounds and the Zeigler catalyst may comprise from 0.01 to 0.30 pound. The catalyst preferably will be $TiCl_3 \cdot \frac{1}{3} AlCl_3$ modified with from 0.5 to 7.0 mols of triethyl aluminum or diethyl aluminum chloride per mol of the $TiCl_3 \cdot \frac{1}{3} AlCl_3$ catalyst. From 0 to 500 pounds of hydrogen per million pounds of propylene feed may be introduced to control the molecular weight of the homopolypropylene which is formed in the first-stage reactor.

In the first reactor, the operating conditions are adjusted to provide a temperature within the range of 145° F. to 175° F., a pressure within the range of 60 to 150 p.s.i.g., and a residence time from 60 minutes to 360 minutes. The product from the first-stage reactor comprises homopolypropylene, living polypropylene chains, unreacted propylene, unreacted hydrogen, catalyst, and diluent. The homopolypropylene and living polypropylene chains will be in solution or slurried in the diluent in the first reactor effluent. A typical product inspection of a first-reactor effluent is given below in Table I.

TABLE I

| | |
|---|---|
| Propylene monomer, lbs./100 lbs. diluent | 0.25–10.0 |
| Total polymer, lbs./100 lbs. diluent | 3.5–47.5 |
| Hydrogen, p.p.m. of propylene feed | 0–500 |
| Catalyst, lbs./100 lbs. diluent | .01–.30 |
| Percent of total polymer that is living chains (by indirect approximation), percent of total polymer | 5–20 |

The total effluent from the first reactor is introduced into a second-stage reactor to engraft ethylene onto the living polypropylene chains. It is desired that the ethylene be added as a continuous chain containing a minimal amount of random propylene molecules. For this purpose it has been found that the second-stage reactor should be operated under conditions to minimize the backmixing of the stream during the polymerization reaction. This is most suitably accomplished by utilizing a second-stage reactor having a L/D ratio of at least 1 to 500, suitably within the range of 2 to 100, preferably from 50 to 500.

The charge stock into the elongated second reaction zone comprises the effluent from the first-stage reactor which contains (on a diluent-free basis) from 80% to 95% polypropylene by weight, from 5% to 20% living polypropylene chains (by weight), and from 0.01 to 0.30 weight percent catalyst. The diluent may comprise from 300% to 2000% by weight of the other constituents in the second reactor charge stream. Ethylene is charged at the rate of 0.5 to 7.5 pounds per 100 pounds of total diluent charged to the second reactor. The reaction conditions within the second reactor are chosen from a temperature within the range of 120° F. to 175° F., a pressure within the range from 20 to 150 p.s.i.g., and a residence time from 0.25 to 120 minutes. By suitably selecting the proper conditions within these broad ranges and utilizing a reactor of the proper L/D ratio, a product stream may be obtained from the second reactor having a typical analysis as follows.

TABLE II

| | |
|---|---|
| Propylene monomer, lbs./100 lbs. diluent | 0.25–10.0 |
| Ethylene monomer, lbs./100 lbs. diluent | 0.0–0.25 |
| Total polymer, lbs./100 lbs. diluent | 3.5–50.0 |
| Hydrogen, p.p.m. of propylene feed | 0–500 |
| Catalyst, lb./100 lbs. diluent | 0.01–0.30 |

The effluent from the second-stage reactor comprises the polymer product in solution and slurried in the diluent, and is carried into a flash zone in order to vent unreacted ethylene, propylene, and hydrogen (if any). After venting the noncondensibles, the catalyst is killed by the addition of 0.0 to 0.5 weight percent HCl and 0 to 4 weight percent methanol (or other alcohols or other antisolvents), and the polymer product is then rejected from the solution by the addition of from 15% to 40% methanol or other antisolvent. The antisolvent effect of methanol is such that by controlling the amount of methanol added in the rejection step, the properties of the polymer may be optimized. Thus, the ether solubles may be kept below about 8% to 10%, thus minimizing the random copolymer and atactic polymer which appear in the final polymer product. After the rejection step, the polymer is present in the stream as a slurry and is separated by sequential filtration steps, washed, dried, and extruded and pelletized into the final product.

The process may be more clearly understood by reference to FIG. 1.

In FIG. 1, the propylene reactor is represented by the figure 100 and is shown to be provided with an agitating means 102. Into the reactor 100 are charged propylene by line 104; xylene diluent by line 106; catalyst by line 108; and hydrogen by line 109. The propylene is polymerized in the first-stage reactor at a temperature of about 170° F. for a residence time of about 240 minutes, and is then discharged as first-reactor effluent by way of line 110 and is introduced into the second-stage reactor 120 along with ethylene feed stock introduced by way of line 122 and, if desired, additional xylene diluent introduced by way of line 124. The second-stage reactor is elongated and the flow conditions therewithin are suitably chosen in order to minimize backmixing within the reactor proper. In the second-stage reactor, the ethylene is engrafted upon the living polymer chains which are introduced with the first-reactor effluent into the second reactor. By minimizing the backmixing within the second-stage reactor, the ethylene is engrafted in a substantially nonrandom manner upon the polypropylene blocks, so that the inclusion of random molecules of propylene into the ethylene block is held to a minimum. Substantially no random ethylene-propylene polymer is formed, and no homopolyethylene is observable in the final product.

The effluent from the second reactor may be passed through a larger holding zone which would constitute a second stage of the second reactor, as is shown by the reactor 130, or preferably is passed around the reactor 130 by way of line 132, and is charged directly into a flash zone from whence unreacted ethylene and propylene are removed by way of line 136. Ethylene may be introduced into the reactor 130, if it is used, by way of line 138. Alternatively, if desired, the second-stage reactor 120 may be used merely as a transfer line and ethylene injected not through line 122 but rather through line 138. However, the introduction of ethylene into the reactor 130 rather than into the transfer line reactor 120 results in a loss of sharpness in the block and the introduction of more random propylene molecules into the ethylene portion of the copolymer chain.

In the flash zone 134, methanol is admitted by way of line 140 and HCl by way of line 142 in order to terminate the polymerization reaction and to solubilize the catalyst. The resulting polymer in xylene solvent is removed by way of line 144 and pump 146 and transmitted by way of line 148 into the rejection zone 150. Methanol is introduced into the rejection zone 150 by way of line 152. It has been found that in order to optimize the physical properties of the final copolymer product, from 22% to 28% methanol based on methanol plus diluent should be introduced in the zone 150. This adjusts the ether solubles in the solid polymer product which is recovered. From the zone 150 the polymer is removed in a slurry by way of line 152 and is treated in sequence, for example, by way of filtration zone 160 and reslurrying zone 162, and is then discharged for further purification and extrusion into the pelletized product. Suitable oxidation inhibitors or stabilizer systems may be incorporated with the block copolymer if desired.

A number of runs were made utilizing a setup similar to that shown in FIG. 1. In order to determine the effect of reactor geometry on the final product, the ethylene was injected at a point corresponding to line 122 and later at a point corresponding to line 138. In addition, a reactor similar to 130 was provided to increase the effective volume of the reactor 130 in order to evaluate the effect of this addition to the residence time. Thus, four combinations of reactor geometry were provided: (I) wherein ethylene was introduced into the transfer line from the first reactor followed by two larger reactors; (II) where the ethylene was injected into the transfer line followed by one reactor 130, having a $L/D$ ratio of 2; (III) where the ethylene was injected into the reactor 130 having an $L/D$ ratio of 2 followed by a second reactor of the same size; and (IV) where the ethylene was injected into the reactor 130 not followed by a further reaction zone. The transfer line had an effective $L/D$ ratio of 100. The results of the comparisons of these runs are shown in the following table.

TABLE III

| Reactor system | I | II | III | IV |
|---|---|---|---|---|
| Typical product | C1005 | C1008 | C1021 | C1042 |
| Melt index | 3.6 | 3.2 | 3.8 | 2.7 |
| IR ratio 720/730 cm.$^{-1}$ | 1.454 | 1.702 | 1.525 | 1.691 |
| Stiffness, p.s.i | 109,900 | 118,400 | 95,100 | 100,800 |
| Tensile strength, p.s.i | 3850 | 4075 | 3450 | 3800 |
| Hardness, Rockwell | 78 | 79 | 71 | 80 |
| Izod impact, ft.-lbs. per min.: | | | | |
| 0° F | 21.5 | 18.3 | 22.2 | 16.4 |
| −20° F | 16.8 | 15.2 | 17.3 | 15.2 |
| −40° F | 13.2 | 12.4 | 12.6 | 12.0 |
| Ether solubles | 3.9 | 2.6 | 5.6 | 2.9 |
| Ethylene, wt. percent | 8.60 | 8.60 | 9.98 | 9.76 |

From an examination of Table III it is seen that the maximum sharpness of the polymer block as measured by the infrared ratio 720/730 cm.$^{-1}$ was obtained when injecting the ethylene into the transfer line reactor followed by a single residence zone. However, indications of the reaction taking place in the transfer line, obtained by sampling the product just before admission into the large reactor zone, are that this holding zone is not necessary and that the transfer line can be used alone. Note that the product obtained under the reactor system (II) has the greatest tensile and stiffness strength which was obtained, and yet the impact strength at −40 F. was comparable to that obtained by other reactor systems. Note also that this reactor system (II) produced the minimum amount of ether solubles, which, when considered with the high infrared ratio, indicates a negligible amount of random copolymerization. Thus, it is seen that the stiffness, tensile strength, and low-temperature impact strength in the final product have been optimized by the system designated (II).

The polymer product

Turning now to the polymer product which is obtained, the polymer is distinguished from prior art copolymers by the optimization of the low-temperature impact strength, the tensile strength, and the stiffness, as shown in Table III, and as indicated by the low content of ether solubles and the high ratio of infrared absorbents when measured at 720/730 cm.$^{-1}$, which is a measure of the lack of randomness in the polymer molecule.

Figure 2:
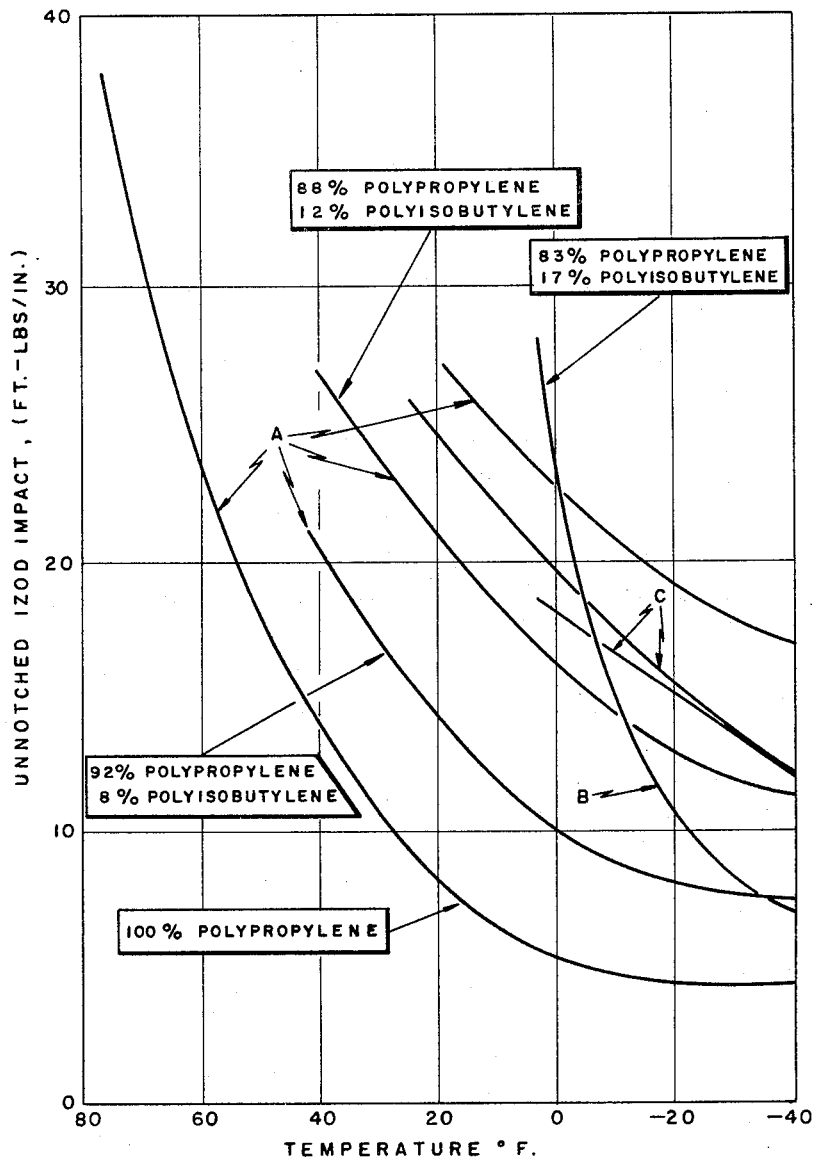

Referring now to FIG. 2, the properties of the present polymer (Curves C) are compared with the properties of commercial grade polypropylene blended with polyisobutylene (Curves A) as well as with properties of a commercial ethylene-propylene block copolymer (Curve B), which is generally similar to the present product, but does not exhibit the high sharpness of delineation between the propylene and ethylene portions of the chain that is achieved in the polymer of the present invention. As is seen from FIG. 2, the low temperature impact strength, particularly at −40° F., is superior in the case of the present invention both to the commercial block copolymer and to the blended polypropylene except where extremely large amounts of polyisobutylene are incorporated. A comparison of properties is shown below in Table IV.

and 730 cm.$^{-1}$ roughly the same absorbance is exhibited, with absorbance at 730 cm.$^{-1}$ being greater than that at 720 cm.$^{-1}$. This would give a 720/730 cm.$^{-1}$ of less than 1.0. The polymer of the present invention exhibits a ratio of IR absorbance at 720 cm.$^{-1}$/IR absorbance at 730 cm.$^{-1}$ within the range of 1.3 to 1.7.

The ratio of absorbances at 720/730 cm.$^{-1}$ is indicative of the "sharpness" of the block formed. Ratios less than 1.3 indicate that the ethylene portion of the block contains a substantial number of propylene molecules, producing a random "tail" on the polymer. At higher ratios, a "sharper" block is indicated. It has been found that the desirable combination of properties of the present polymer is exhibited only at the higher ratios (i.e., above 1.3).

Figure 6:
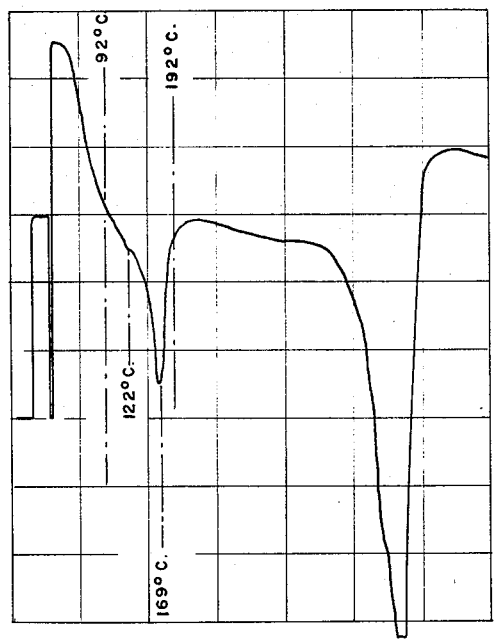

FIG. 6 is a differential thermal analysis of the poly-

TABLE IV.—COMPARISON OF CHARACTERISTICS

| | Polypropylene homopolymer | Poly C$_3$- 8-10% Vistanex [1] | Poly C$_3$- 11-14% Vistanex | Poly C$_3$- 16-19% Vistanex | PEX-73 [2] | Poly C$_3$- 25% PEX-73 | Poly C$_3$- 50% PEX-73 | Poly C$_3$- 75% PEX-73 | PEX-59 [3] |
|---|---|---|---|---|---|---|---|---|---|
| Melt index | 6.4 | | | | 5.5 | 6.1 | 6.1 | 5.6 | |
| Unnotched Izod at— | | | | | | | | | |
| 0° F | 4.8 | 8.7 | 16.0 | 22.7 | 22.0 | 7.9 | 13.7 | 19.5 | 26.8 |
| −20° F | 4.6 | 7.0 | 13.8 | 20.8 | 19.7 | 6.5 | 10.0 | 15.5 | |
| −40° F | 4.3 | 6.3 | 12.2 | 18.9 | 18.9 | 6.3 | 9.4 | 12.2 | 18.8 |
| Stiffness in flexure, p.s.i | 132,200 | 113,556 | 103,670 | 93,093 | 86,400 | 105,200 | 92,700 | 88,000 | 80,700 |
| Tensile at yield, p.s.i | 4714 | 3682 | 3502 | 3106 | 3017 | 4037 | 3710 | 3516 | 3167 |
| Elongation at yield, percent | 16.2 | | | | 16.0 | 18.5 | 18.3 | 17.8 | 20.5 |
| Rockwell Hardness, R | 203 | | | | 71 | | 152 | 142 | 68 |
| Vicat softening point (est.) | ∼290 | | ∼250 | ∼205 | ∼280–285 | ∼280–290 | ∼280–290 | ∼280–290 | |

[1] Vistanex-polyisobutylene. Percent shown is weight percent of total blend.
[2] Block copolymer from run 73 while using diethyl aluminum chloride cocatalyst.
[3] Block copolymer from run 59 while using triethyl aluminum as cocatalyst.

From Table IV it is seen that the copolymer products PEX-73 and PEX-59 had essentially the same low temperature impact strength as a blend of polypropylene with 16% to 19% polyisobutylene. It was only slightly lower in stiffness and tensile strength, and would therefore be competitive in the market as a "high impact grade" polymer.

Figure 3:
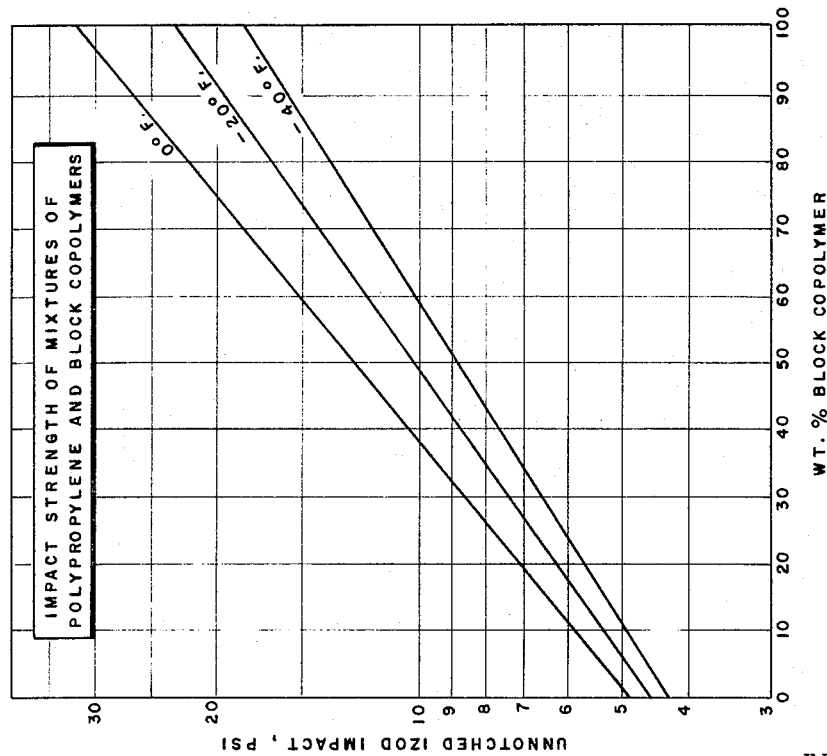

From Table IV and FIG. 3 it is seen that lower impact grades can be made by blending the copolymer with polypropylene. Although the impact strength decreases, the stiffness and tensile strength increase with increasing amounts of polypropylene. The linearity of blending characteristics exemplified by impact strength (as shown in FIG. 3) allows commercial production of a single grade of high impact copolymer, and the lower impact grades can be made by compounding with polypropylene. This allows optimization of process variables and produces in general a better quality polymer than is obtainable where process conditions must be often changed.

It has been found that the polymer must contain at least 6 weight percent ethylene and a maximum of about 10 weight percent ethylene in order to obtain the maximization of values which has been herein shown. Thus, the polymer of the present invention is characterized by containing from 90% to 94% polypropylene and 4% to 10% ethylene, by weight, and having an infrared absorbence ratio measured at 720 cm.$^{-1}$ divided by 730 cm.$^{-1}$ of between 1.3 and 1.8, and having a stiffness in the range of 100,000 pounds per square inch, a tensile strength in the area of 3800 to 4100 pounds per square inch, and an Izod impact (untouched at −40° F.) of around 12.0. This combination of proper ties makes the polymer product of the present invention an extremely valuable polymer for low-temperature applications.

Figure 4:
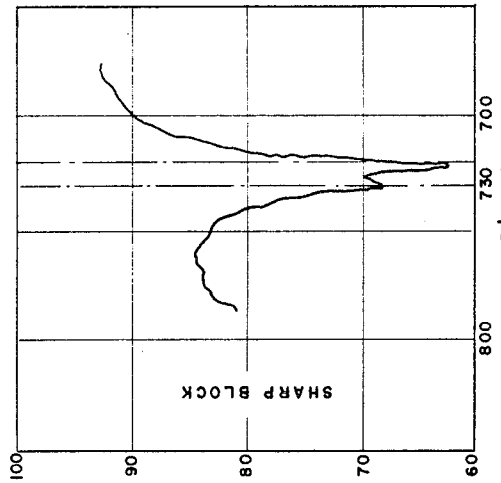
Figure 5:
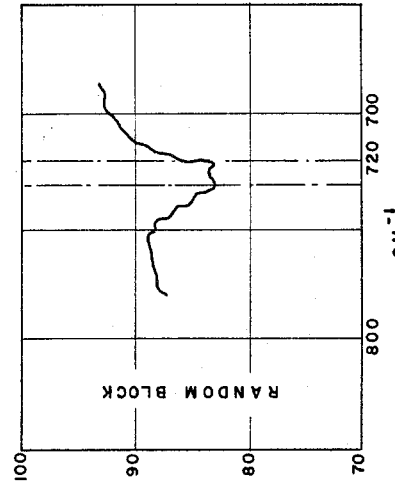

The distinctive quality of the polymer produced by the present invention is further exemplified by reference to FIGS. 4, 5 and 6. FIG. 4 is a reproduction of the infrared absorbance chart within the area of 700 to 800 cm.$^{-1}$. Note the sharp distinction between absorbances at 720 cm.$^{-1}$ as compared to the absorbances at 730 cm.$^{-1}$. Referring now to FIG. 5, a similar infrared absorbance curve is shown for a random block copolymer which does not achieve the high degree of sharpness in the ethylene portion of the copolymer. Note that at 720 mer of the present invention which was obtained using air as a standard and a heating rate of 10° C. per minute. The DTA indicates the melting point by the position of the peak and the degree of crystallinity from the area under the peak.

As hereinbefore noted, the properties of the present polymer may be varied somewhat by varying both the operating conditions and the reactor geometry. As pointed out in connection with Table III, by injecting the ethylene into a transfer line reactor having a $L/D$ ratio within the range of 50 to 500, the sharpness of the block is improved and the physical properties maximized with respect to strength, with the low-temperature impact strength suffering slightly as the stiffness and tensile strength are optimized. By adding holding zones downstream of the transfer line reactor, increasing the residence time during the ethylene reaction, the stiffness and tensile strength are increased with but slight debit from the standpoint of low-temperature impact strength. Note also that the ether solubles may be kept below about 3% by keeping the residence time in the ethylene reaction zone at a desirable minimum of 0.25 minute, regardless of whether it is a transfer line reactor or a larger reactor. The properties may also be controlled by varying the percent of soluble polymer which is controlled by the alcohol content of the slurry.

The polymer product of the present invention has been found to exhibit linear blending properties with respect to homopolypropylene, so that an entire range of polymer products may be obtained merely by blending the block copolymer with homopolypropylene. This is shown clearly in FIG. 3 wherein the unnotched Izod impact strengths are shown against the weight percent block copolymer at the various temperatures.

The polymer product of the present invention has been found to comprise an intimate homogeneous mixture of homopolypropylene and the block copolymer. X-ray and other inspection have indicated that the final product contains from about 15% to about 40% ethylene-propylene sharp block copolymer, the remainder being almost completely homopolypropylene.

A number of runs were made wherein the general process scheme above discussed was used, and a variety of products obtained when viewing different combinations of variables in both first and second-stage reactors. A small number of these runs are summarized below.

TABLE V

| Reactor system | C1005 I | C1008 II | C1021 III | C1042 IV |
|---|---|---|---|---|
| 1st reactor: | | | | |
| Pressure, p.s.i.g. | 90 | 90 | 90 | 90 |
| Temperature, °F | 170 | 175 | 170 | 175 |
| Xylene, #/hr | 14,000 | 14,000 | 14,000 | 14,000 |
| Propylene, #/100 # xylene | 20 | 20 | 20 | 20 |
| Ti rate, #/100 # xylene | 0.05 | 0.05 | 0.05 | 0.06 |
| Al/Ti mol ratio | 2.5 | 2.5 | 2.5 | 3.0 |
| Residence time, hrs | 4.0 | 4.0 | 4.0 | 4.0 |
| $H_2$ rate, p.p.m. on $C_3^=$ charged | 35 | 43 | 57 | 25 |
| 2nd reactor: | | | | |
| Temperature, °F | 170 | 170 | 170 | 175 |
| Additional xylene, #/hr | 10,000 | 10,000 | 12,500 | 10,000 |
| Total xylene, #/hr | 24,000 | 24,000 | 26,500 | 24,000 |
| Ethylene, #/100 # xylene | 0.625 | 0.625 | 0.83 | 0.92 |
| Residence time, hrs | 0.18 | 0.18 | 0.34 | 0.38 |
| Conversions: | | | | |
| Percent $C_3^=$ in 1st reactor | 89 | 88 | 86 | 88 |
| Percent $C_3^=$ in 2nd reactor | ~0 | ~0 | ~0 | ~0 |
| Percent $C_2^=$ in 2nd reactor | 85 | 85 | 4 | 87 |

Applicants having disclosed the essence of their invention and the specific embodiment thereof, what is desired to be covered by Letters Patent should be determined not by the specific examples herein given, but rather only by the appended claims.

We claim:
1. A method of obtaining a sharp block copolymer product having an infrared 720 cm.$^{-1}$/730 cm.$^{-1}$ absorbance ratio from 1.3 to 1.7 which comprises passing through a reaction zone having an $L/D$ ratio from 50 to 500, without substantial backmixing, a continuous charge stream consisting of separately introduced streams of:
   (a) a mixture of:
      100 parts by weight of a diluent hydrocarbon,
      from 3.5 to 47.5 parts by weight of a polymer consisting of from 5 to 20 weight percent living polypropylene chains and correspondingly from 95 to 80 weight percent polypropylene homopolymer,
      and from 0.25 to 10.0 parts by weight of unreacted propylene, in contact with from 0.01 to 0.30 part by weight of a catalyst consisting of $TiCl_3 \cdot \frac{1}{3} AlCl_3$ modified with from 0.5 to 7.0 mols of triethyl aluminum or diethyl aluminum chloride per mol of $TiCl_3 \cdot \frac{1}{3} AlCl_3$, and
   (b) sufficient ethylene to obtain upon reaction a copolymer product containing from 6 to 10 weight percent reacted ethylene, under conditions including:
      an ethylene charge rate from 0.5 to 7.5 pounds per hundred pounds of diluent,
      a temperature from 120° to 175° F.,
      a pressure from 20 to 150 p.s.i.g., and
      a residence time from 0.25 to 120 minutes.

2. A method in accordance with claim 1 wherein:
   the reaction zone $L/D$ ratio is about 100;
   the diluent hydrocarbon is xylene;
   the temperature is about 170° F.;
   the residence time is about 10.8 minutes;
   and about 7.5 parts by weight of additional xylene is added to said charge stream.

3. A method in accordance with claim 1 further comprising the steps of:
   removing the effluent from said reaction zone,
   in a flash zone, flashing vaporous hydrocarbons, including unreacted ethylene and propylene, from said effluent,
   in said flash zone, contacting said effluent with from 0 to 0.5 weight percent HCl, based on diluent, whereby a polymer slurry-stream is obtained,
   contacting said polymer-slurry stream with from 15 to 40 weight percent alcohol in a rejection zone, whereby a product polymer slurry is obtained, and separating said copolymer product from said product polymer slurry.

4. A method of preparing a sharp block copolymer product having an infrared 720 cm.$^{-1}$/730 cm.$^{-1}$ absorbance ratio from 1.3 to 1.7 which comprises:
   continuously charging per unit of time into a first reaction zone:
      100 parts by weight of a diluent hydrocarbon chosen from the group consisting of aromatic hydrocarbons, alkyl-substituted aromatic hydrocarbons, paraffins, and isoparaffins,
      from 5 to 50 parts by weight of propylene,
      from 0.01 to 0.30 part by weight of a catalyst consisting of $TiCl_3 \cdot \frac{1}{3} AlCl_3$ modified with from 0.5 to 7.0 mols of triethyl aluminum or diethyl aluminum chloride per mole of $TiCl_3 \cdot \frac{1}{3} AlCl_3$,
      and from 0 to 500 pounds of hydrogen per million pounds of propylene feed,
   polymerizing said propylene in said first reaction zone under conditions including:
      a temperature from 145° to 175° F.,
      a pressure from 60 to 150 p.s.i.g., and
      a residence time from 60 to 360 minutes,
   said conditions being correlated to obtain:
      from 3.5 to 47.5 parts by weight of a polypropylene product consisting of:
         from 80 to 95 weight percent homopolymer and, correspondingly,
         from 20 to 5 weight percent living polypropylene chains,
      and from 0.25 to 10 parts by weight of unreacted propylene,
   charging the total effluent from said first reaction zone into a second reaction zone having an $L/D$ ratio from 1 to 500,
   adding to said total effluent from 50 to 200 parts by weight of additional diluent,
      said additional diluent being at a temperature from 60° to 120° F. lower than the temperature of said total effluent,
   charging from 0.5 to 7.5 parts by weight of ethylene per hundred parts of total diluent charged into the second reaction zone
      the mol ratio of ethylene to propylene charged to said second reactor being from 0.2 to 5,
   said ethylene, propylene and living polypropylene chains while passing in admixture through said second reaction zone without substantial backmixing under polymerizing conditions including:
      a temperature from 120° to 175° F.,
      a pressure from 20 to 150 p.s.i.g., and
      a residence time from 0.25 to 120 minutes,
   said polymerizing conditions being correlated to obtain a second reaction zone effluent containing both solid and dissolved polymer, said polymer containing from 6 to 10 weight percent reacted ethylene,
   in a flash zone, removing from said second reaction zone effluent vaporous hydrocarbons including possible unreacted ethylene and propylene,
   in said flash zone, contacting said effluent with from 0 to 4% methanol and from 0 to 0.5% HCl (based on diluent), to obtain a polymer slurry stream,
   in a holding zone, contacting said polymer slurry stream with from 15 to 40 weight percent of an alcohol, whereby a product polymer slurry is obtained,
   and recovering said product polymer from said product polymer slurry.

5. A method in accordance with claim 4 wherein:
   the diluent is xylene;
   the conditions in said first reaction zone include:
      a temperature of about 175° F.,
      a pressure of about 90 p.s.i.g.,
      a residence time of about 4 hours, a propylene charge of about 20 parts by weight,
a catalyst charge containing 0.05 part by weight of titanium, said catalyst having a mol ratio of Al/Ti of about 2.5, and
a hydrogen charge rate of 43 pounds per million pounds of propylene charged, the conditions in said second reaction zone include:
an ethylene charge of about 0.625 part by weight per hundred parts of diluent,
a temperature of about 170° F., and
a residence time of about 0.18 hour, and said second reaction zone has an $L/D$ ratio of about 100.

References Cited

UNITED STATES PATENTS

| | | | |
|---|---|---|---|
| 3,200,173 | 8/1965 | Schilling | 260—878 |
| 3,247,176 | 4/1966 | Veal | 260—878 |

FOREIGN PATENTS

| | | |
|---|---|---|
| 601,560 | 2/1960 | Italy. |

MURRAY TILLMAN, *Primary Examiner.*

M. J. TULLY, *Assistant Examiner.*